(12) United States Patent
Hopper et al.

(10) Patent No.: US 6,286,124 B1
(45) Date of Patent: Sep. 4, 2001

(54) END TO END WALKING PRINT

(75) Inventors: Samuel Neely Hopper; Christopher Starbuck Kush; John Charles Wilson, all of Longmont, CO (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/296,206

(22) Filed: Apr. 21, 1999

(51) Int. Cl.$^7$ .............................. G06F 11/00; G06F 7/02
(52) U.S. Cl. ............................... 714/799; 714/819
(58) Field of Search ........................... 714/799, 811, 714/819, 820, 821, 712, 715, 48, 49, 56; 355/81, 78, 18; 358/400, 401, 405, 408, 447, 448, 452, 462, 471, 474

(56) References Cited

U.S. PATENT DOCUMENTS

| | | | |
|---|---|---|---|
| 4,558,428 | * 12/1985 | Matsumura et al. | 364/900 |
| 4,657,372 | 4/1987 | Ikeda et al. | 355/16 |
| 5,313,564 | 5/1994 | Kafri et al. | 395/101 |
| 5,822,499 | 10/1998 | Okada et al. | 395/101 |
| 5,892,590 | * 4/1999 | Ida et al. | 358/406 |
| 6,122,757 | * 9/2000 | Kelley | 714/39 |

* cited by examiner

Primary Examiner—Christine T. Tu
(74) Attorney, Agent, or Firm—Blakely, Sokoloff, Taylor & Zafman LLP

(57) ABSTRACT

An method and apparatus for error checking. A known test pattern is written into a predetermined byte of a scan line. The method may include generating a known test pattern in a byte of a scan line and transmitting the scan line data through a first data path. The scan line data at the end of the first data path may be evaluated to determine if the test pattern is still in the predetermined byte of the scan line. If the pattern in the predetermined byte is correct, the test pattern may be removed from the predetermined byte and the scan line data may be transmitted to a print engine. If the pattern in the predetermined byte is incorrect, then a signal may be sent to terminate the transmission of the scan line data.

19 Claims, 5 Drawing Sheets

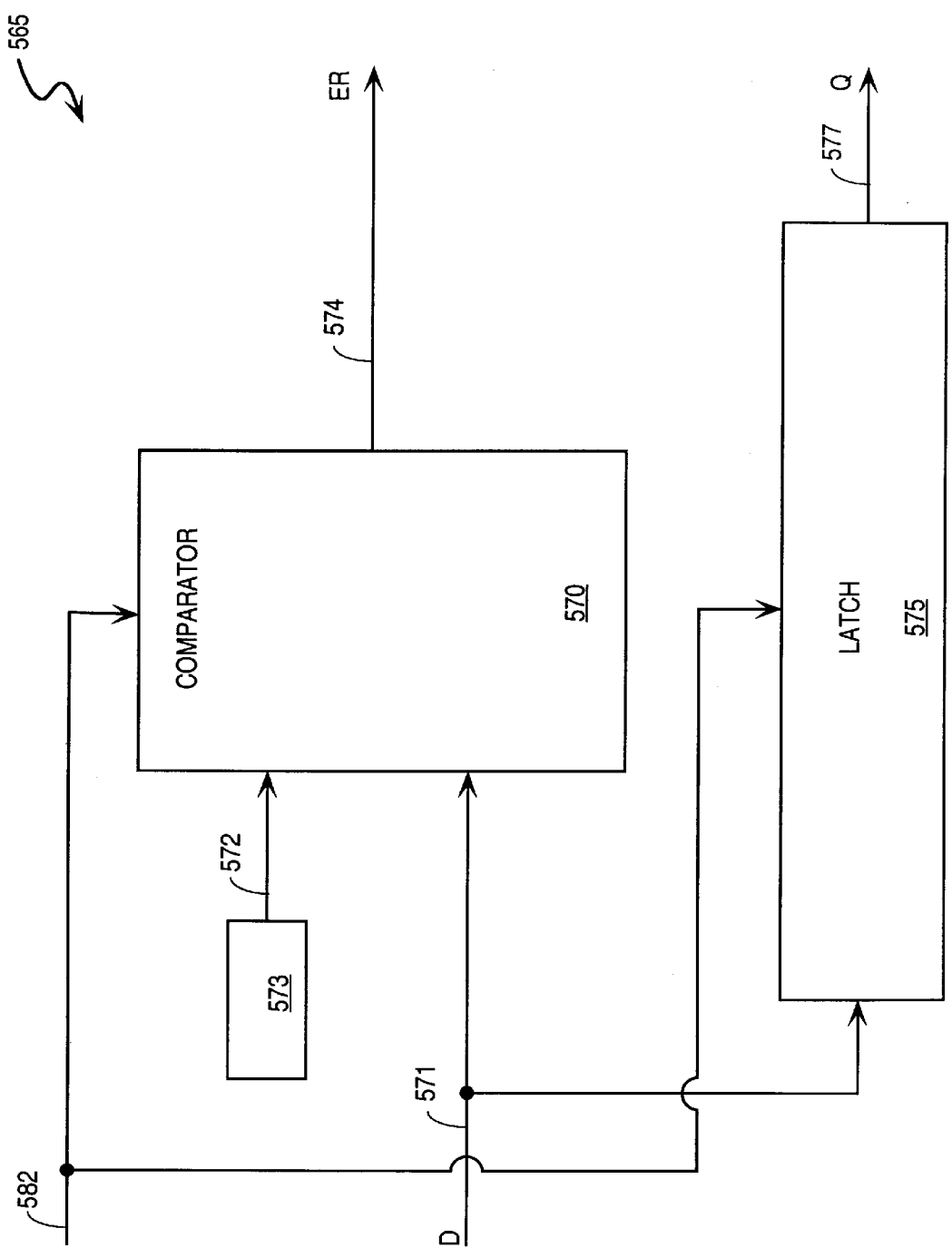

END TO END WALKING PRINT

FIELD OF THE INVENTION

This invention relates to the field of digital scanning devices and, more specifically, to error checking in digital scanning devices.

BACKGROUND

In electrophotographic reproduction devices, for example a printer, a host computer sends and receives control data to command various operations from the host computer to the printer. One type of control data relates to the positioning of page data to be generated on a print surface.

Typically, in printer systems, a printed image is formed using digital data that resides in the page memory of a processor. In one type of printer system, the image from the page memory is formed on a print surface using a scanning laser beam. An area of the print surface on which the image is formed is referred to as a picture element (PEL). One scan of the laser beam across the print surface forms a row of PELs, referred to as a scan row. The image from the page memory is formed with multiple scan rows.

The first PEL must be properly positioned in order for the scan rows to be horizontally and vertically aligned on the print surface. Defects in the data path between the host computer and the printer, however, may cause the scan rows to "walk" or be misaligned. This misalignment may go undetected if the user of the printer system does not inspect each printed page. In addition, testing individual components within the data path for defects adds to manufacturing cycle time and, thus, increases the cost of the printer systems.

SUMMARY OF THE INVENTION

The present invention provides a method of and apparatus for error checking. The method may include generating a known pattern in a predetermined segment of data having a plurality of segments and transmitting the data through a first data path having an end. The method may also include evaluating the data at the end of the first data path to determine if the data has the known pattern, and transmitting the data through a second data path based on the evaluating of the data at the end of the first data path.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 illustrates one embodiment of an error check circuit.

DETAILED DESCRIPTION

An end to end walking print check is described. In the following description, numerous specific details are set forth such as examples of specific circuits, components, processes, etc. in order to provide a thorough understanding of the present invention. It should be appreciated, however, that these specific details need not be employed to practice the present invention. In other instances, well known structures and circuits have not been described in detail in order to avoid unnecessarily obscuring the present invention.

Figure 1:
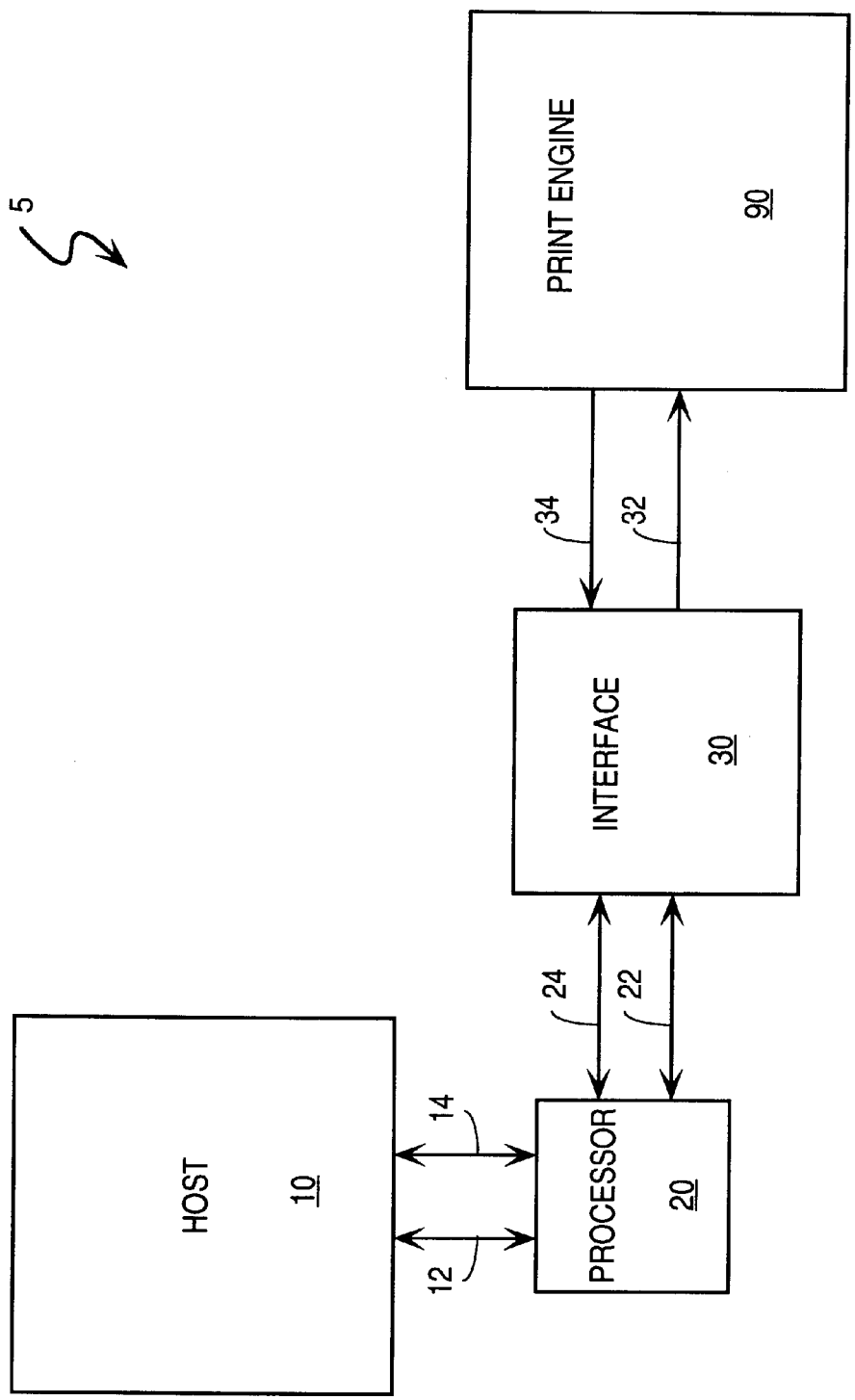
FIG. 1 illustrates one embodiment of a data printing system.

FIG. 1 illustrates one embodiment of a data printing system. The data printing system 5 includes a host 10, a processor 20, an interface 30, and a print engine 90. Data printing system 5 transmits data from host 10 to be printed by print engine 90. Host 10 may be any type of computer system, for examples, a laptop computer, a desktop computer, a workstation, a server, and a mainframe. Data and control signals transmitted by host 10 are coupled to processor 20 on signal lines 12 and 14, respectively. Processor 20 contains microcode to construct an image to be printed by print engine 90. The print image is digitally formed in the page memory of processor 20 in a format required by print engine 90 to generate an image. In one embodiment, processor 20 is a reduced instruction set (RISC) microprocessor. In another embodiment, processor 20 may have other types of architectures, for example, a complex instruction set (CISC) architecture. It should be noted that a microprocessor is well known in the art; accordingly, a detailed description of its internal components and operation is not provided herein.

Interface 30 couples data and control signals received from processor 20 on lines 22 and 24, respectively, with print engine 90 on lines 32 and 34, respectively. In one embodiment, print engine 90 is an electrophotographic device that functions to generate a visible image from digital data residing in the page memory of processor 20. In one embodiment, print engine 90 is a 5 beam laser printer. The laser beams are scanned across a photoconductor creating PEL rows to form a visible image on a print surface. In another embodiment, print engine 90 may have more or less than 5 beams.

Figure 2:
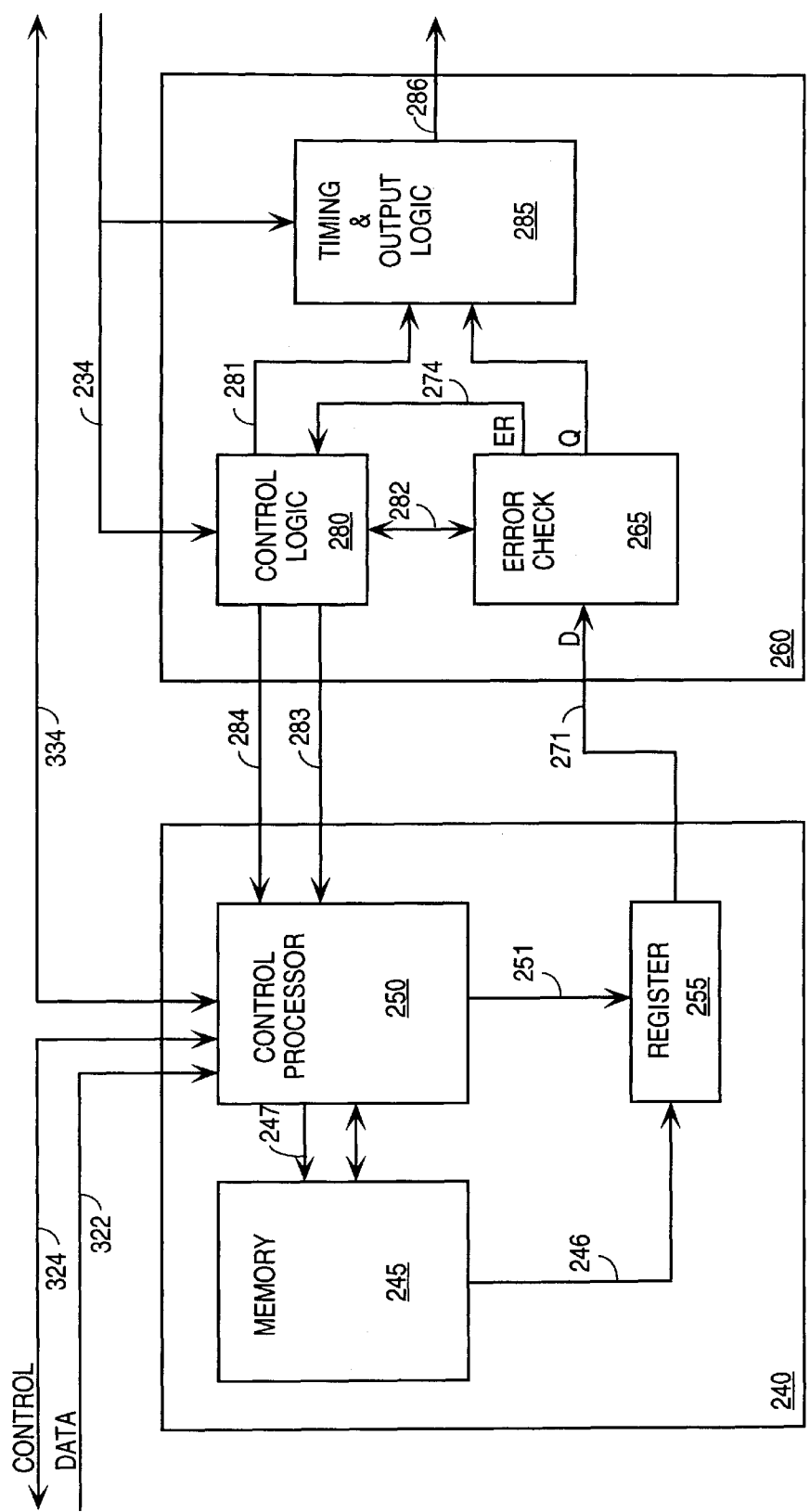
FIG. 2 illustrates one embodiment of an interface circuit.

FIG. 2 illustrates one embodiment of an interface circuit. Interface circuit 230 includes a machine interface card (MIC) 240 and a print data interface card 260. Machine interface card 240 includes a memory 245, a control processor 250, and a register 255. Machine interface card 240 functions to receive page data from processor 20 on line 322 and buffers the page data until the print data interface card 260 is ready to drive the data out to print engine 90 of FIG. 1. The machine interface card 240 receives information from print engine 90 of FIG. 1 regarding the status of the print engine, for examples, if the print engine is warmed up, ready to print, or an error is detected.

Control processor 250 receives data from processor 20 of FIG. 1 on line 322. Control processor 250 receives control information from processor 20 and print engine 90 of FIG. 1, and control logic 280 on lines 324, 334, and 284, respectively. The control processor 250 coordinates the storage and transmission of page data in memory 245 based on the control information received from processor 20 and print engine 90 of FIG. 2. The control information may include, for examples, print ready signals from the print engine, page data initiation signals from the processor, and error signals from print data interface card 260.

The timing of the data transmitted from the processor 20 of FIG. 1, however, may be different from the timing at which data is printed by the print engine 90. Memory 245 buffers data received from processor 20 of FIG. 1 through control processor 250 on line 247 and transmits the buffered data to register 255 on line 246. In one embodiment, register 255 is a first-in first-out (FIFO) register that transmits data to print data interface card 260 on line 271 based on timing signals received from control processor 250 on line 251. In another embodiment, register 255 includes decompression logic to decompress the data if compression algorithms or hardware have been used to compact the page data. Memory 245, register 255, and control processor 250 function to synchronize the timing of data received from the processor 20 with the timing of data output to print engine 90 of FIG. 1.

Print data interface card 260 includes an error check circuit 265, a control logic block 280, and a timing and output logic (TOL) block 285. TOL block 285 controls the timing for which data is driven out to the print engine on output 286 based on a print ready signal received from the print engine on line 234. In one embodiment, the print ready signal is a beam detect signal indicating that a laser beam of the print engine is aligned at the start of a scan line. In another embodiment, the print ready signal provides multiple beam detection if multiple beams are used in print engine 90 of FIG. 1.

Error check circuit 265 evaluates whether there is an error in the data transmitted from processor 20 of FIG. 1. If an error is detected, control logic 280 is signaled on line 274. The control logic 280 then transmits an error signal to the MIC card 240 on line 283 to signal printing engine 90 to stop printing and to inform processor 20 of the error detected in the page data. Errors in the data received by error check circuit 265 may be caused by defects existing in the data path between the processor 20 and print data interface card 260. These defects may cause a condition referred to as "walking" in which the scan lines are printed at starting positions that are offset from a desired starting position.

In an alternative embodiment, the components on machine interface card 240 and print data interface card 260 are contained within a single card. In another embodiment, the components on machine interface card 240 and print data interface card 260 are integrated onto a single substrate.

Figure 3:
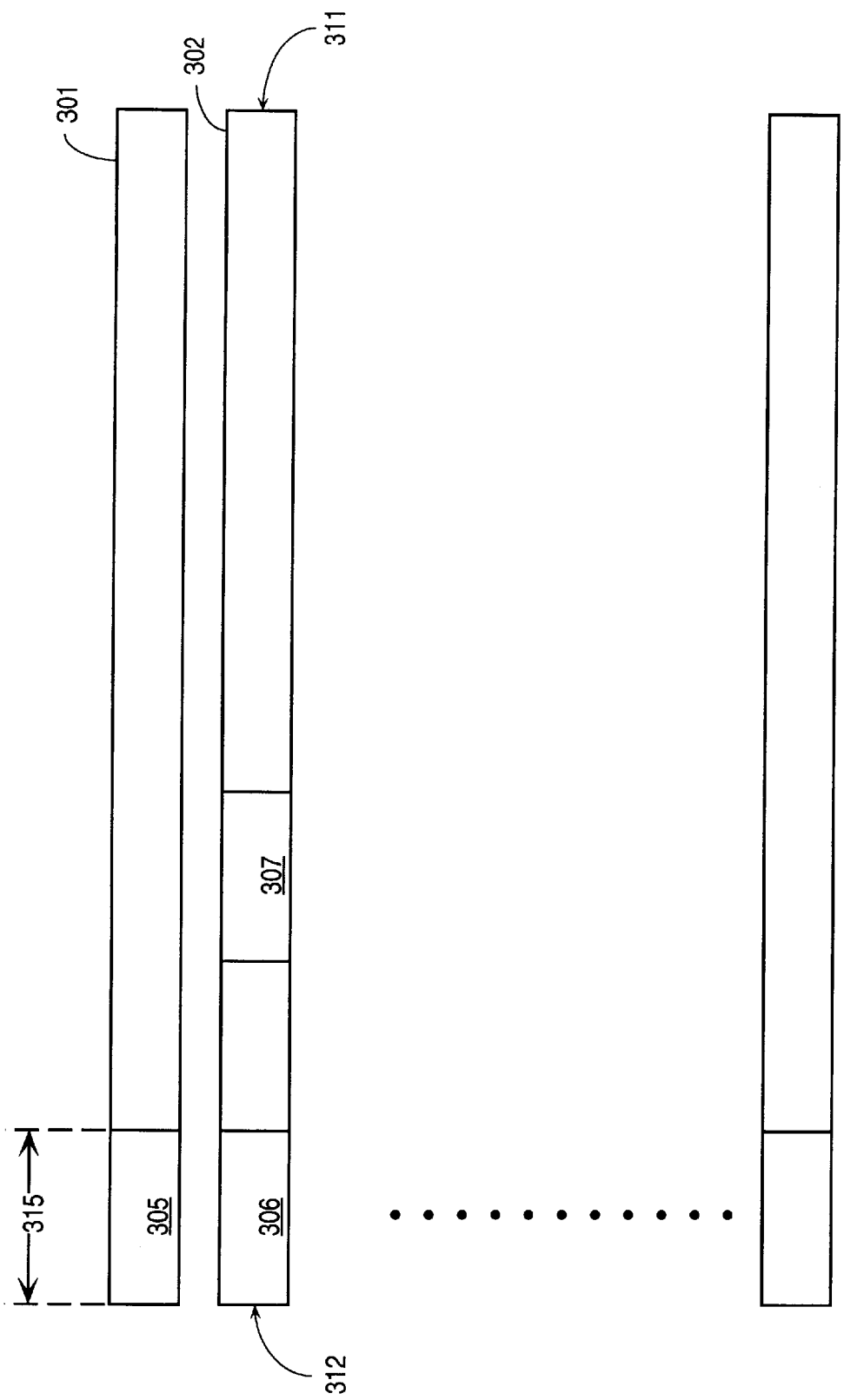
FIG. 3 illustrates one embodiment of scan line patterns.

FIG. 3 illustrates one embodiment of scan line patterns. The page data generated in processor 20 of FIG. 2 is configured into multiple scan lines. Each scan line is made up of multiple bytes containing the page data to be printed. In a black and white printing system, for example, the bytes of a scan line contain gray scale information that the print engine uses to generate a color shade to be printed at a particular bit location on the print surface.

A known test pattern is written into a predetermined test byte from among the multiple bytes of a scan line. In one embodiment, the first byte of each scan line is selected as the test byte. Typically, the first few bytes of each scan line 315 are white because they are ultimately aligned off the edge of the print surface. Since these bytes are not used in the generation of an image on the print surface, they may be used to carry non-page data information. In another embodiment, a byte other than the first byte of a scan line may be selected for the test byte. In yet another embodiment, the known test pattern is written into multiple bytes of a scan line. The test byte of a scan line, for example, byte 305 of scan line 301, is propagated along with the page data bytes of a scan line transmitted from processor 20 to the print data interface card 260. In one embodiment, the known test pattern in the test byte is preselected and coded into the error check circuit 260 of FIG. 2. In another embodiment, the error check circuit 260 is configured to be programmable by processor 20 of FIG. 2 with a data pattern to be compared against the test byte pattern received by the error check circuit 260 of FIG. 2. The error check circuit 260 may be programmed using control lines and data registers (not shown) coupled between the processor and the error check circuit.

If the page data walks, then the test byte in a scan line may shift to other byte positions and not appear in the first byte position of a scan line, as shown in scan line 302. In scan line 302, for example, the known test pattern is shifted from a position of the first byte 306 to a byte 307 position towards the middle of the scan line. The bytes shifted at the end 311 of scan line 302 will be wrapped around to the beginning 312 of scan line 302. As such, the first byte position 306 of the scan line will contain page data information. If the page data information in byte position 306 is similar to the known pattern, the error check circuit 265 of FIG. 2 may erroneously signal that page data has been successfully been transmitted from processor 20 of FIG. 1. In one embodiment, the known test pattern is selected such that it is not similar to any data pattern normally generated in page data. Use of an abnormal bit pattern for the test pattern may prevent an incorrect byte evaluation by error check circuit 265 of FIG. 2. Even if the known bit pattern occurs in some scan lines, the pattern may not be likely to appear in all scan lines and detection of an error in only one of the scan lines is sufficient to stop the print engine.

Figure 4:
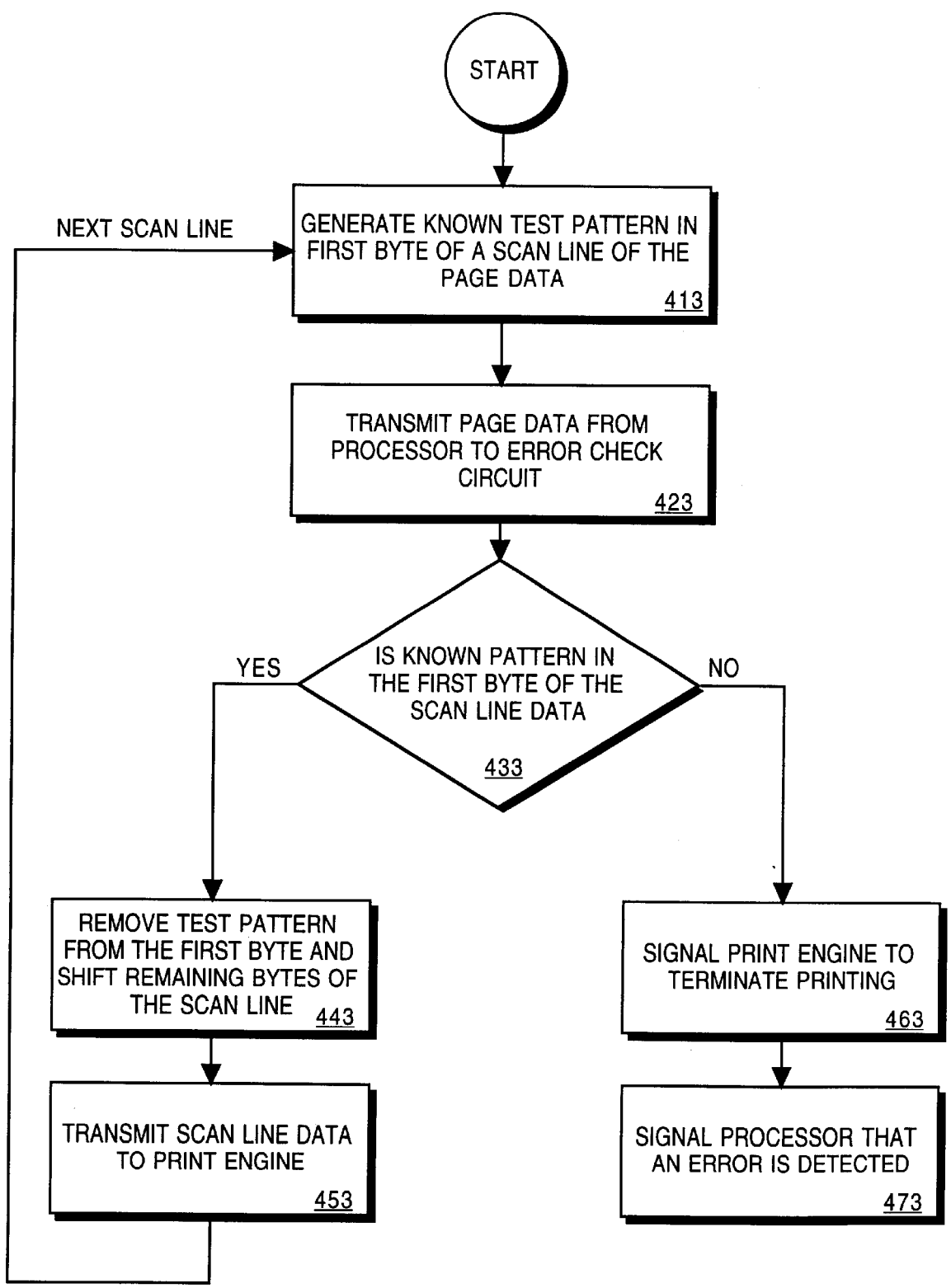
FIG. 4 is a flow diagram illustrating one embodiment of an error checking scheme.

FIG. 4 is a flow diagram illustrating one embodiment of an error checking scheme. The processor 20 of FIG. 1 generates a known test pattern in the first byte of each scan line of page data, step 413. In one embodiment, the known test pattern is an 8 bit pattern. In another embodiment, the known test pattern is more or less than 8 bits. The page data containing the known test patterns is transmitted from processor 20 of FIG. 1 through MIC card 240 to error check circuit 265 of FIG. 2, step 423. The error check circuit 254 of FIG. 2 evaluates the page data to determine if the known test pattern is present in the first byte of each scan line, step 433.

If the known test pattern is present in the first byte of a scan line, the error check circuit 265 of FIG. 2 may remove the known test pattern and shift the remaining bytes to begin in the first byte position of the scan line, step 443. In one embodiment, the print surface of print engine 90 of FIG. 1 is a photoconductor that may be wider than the paper that is used. As such, if the test pattern is not removed, the pattern may be placed on the photoconductor drum and transferred to print engine parts, for examples, coronas wires and brushes, thereby soiling those parts.

In one embodiment, the comparison function and the test pattern removal function are performed in parallel. The data bytes of the scan line are then driven out to the print engine 90 of FIG. 1, step 453.

If the known test pattern is not present in the first byte of a scan line, a signal is sent to MIC 240 through control logic 280 of FIG. 2 indicated that an error is detected. When the error signal is received by MIC 240 of FIG. 2, the transmission of the scan line to print engine 90 of FIG. 2 is inhibited. The control processor 250 of FIG. 2 signals print engine 90 of FIG. 2 to terminate printing, step 463. The control logic 280 of FIG. 2 also signals processor 20 of FIG. 1 that an error is detected in the page data, step 473.

FIG. 5 illustrates one embodiment of an error check circuit. Error check circuit 565 includes a comparator 570 and a latch 575. Page data from register 255 of FIG. 2 is transmitted to comparator 570 and latch 575 on line 571. Comparator 570 performs a comparison function to determine if the data pattern in the first byte of a page data scan line matches the expected test pattern. In one embodiment, a known test pattern that is to be written in the first byte of each scan line is pre-coded into block 573 and applied to comparator 570 on line 572. In another embodiment, block 573 is programmable by processor 20 of FIG. 1.

Comparator outputs an error (ER) signal on line 574 indicating to control logic 280 of FIG. 2 whether the data pattern in the first byte of a scan line matches the pattern in block 573. Latch 575 holds the bytes of the current scan line transmitted from register 255 of FIG. 2. In one embodiment, latch 575 is configured as a shift register. The control logic 280 of FIG. 2 is coupled to latch 575 on line 582. In one embodiment, control logic 280 of FIG. 2 signals latch 575 to shift the bytes of the current scan line held in the latch to begin in the first byte position at the same time comparator 570 performs its comparison function. If no error signal is received from comparator 570, control processor 250 of FIG. 2 signals latch 575, through control logic do 280, to output the data bytes of the scan line to TOL 285 of FIG. 2 on line 577.

It should be noted that a comparator and a latch are well known in the art; according a detailed description of their internal components and operation are not provided herein. In an alternative embodiment, the evaluation of the known test pattern in a predetermined position of a scan line may be performed using other circuit configurations.

It should be noted that the error checking scheme described herein is not limited only to printer systems. In other embodiments, the error checking scheme described herein may also be used with other digital data scanning systems, for example, a high definition television system.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of error checking, comprising:
    generating a known pattern in a predetermined segment of data having a plurality of segments;
    transmitting the data through a first data path having an end;
    evaluating the data at the end of the first data path to determine if the data has the known pattern; and
    transmitting the data through a second data path based on the evaluating of the data at the end of the first data path.

2. The method of claim 1, wherein evaluating the data further comprises:
    removing the known pattern from the predetermined segment of the data if the known pattern is present at the end of the first data path;
    adjusting the data to reside in the predetermined segment; and
    transmitting the data through the second data path.

3. The method of claim 2, wherein the second data is not transmitted through the second data path if the data does not have the known pattern at the end of the first data path.

4. The method of claim 3, wherein the predetermined segment of the data is a first byte of the data and wherein adjusting the data comprises shifting the data to begin in the first byte.

5. The method of claim 3, further comprising terminating the transmission of the data through the first data path.

6. A method of error checking, comprising:
    generating a known pattern in a first byte of a first data;
    transmitting the first data from a processor to a comparator and a latch, the comparator having the known pattern;
    evaluating if the known pattern is in the first byte of the first data transmitted to the comparator; and
    generating a second data if the known pattern is in the first byte of the first data transmitted to the comparator.

7. The method of claim 6, wherein the second data is generated using the latch based on the evaluation of the known pattern in the first byte of the first data transmitted to the comparator.

8. The method of claim 6, wherein the second data is not generated if the known pattern is not in the first byte of the first data transmitted to the comparator.

9. The method of claim 7, wherein generating the second data comprises:
    removing the known pattern from the first byte of the first data; and
    shifting the first data to begin in the first byte to form the second data.

10. A circuit for error checking, comprising:
    a comparator to receive a first data having a predetermined position pattern, the comparator having a known pattern, the comparator to compare the predetermined position pattern with the known pattern and generate an output;
    a latch coupled to receive the first data and generate a second data; and p1 a control circuit coupled to the comparator and the latch, the control circuit to signal the latch to output the second data based on the output of the comparator.

11. The circuit of claim 10, wherein the output of the comparator is a first value if the predetermined position pattern matches the known pattern and wherein the output of the comparator is a second value if the predetermined position pattern does not match the known value.

12. The circuit of claim 11, wherein the control circuit signals the latch to output the second data if the output of the comparator has the first value.

13. The circuit of claim 12, wherein the second data generated by the latch is the first data with the predetermined position pattern removed.

14. The circuit of claim 13, wherein the first data is shifted to begin at a location occupied by the predetermined position pattern.

15. A data processing circuit, comprising:
    a processor to transmit a first data;
    a memory coupled to receive the first data from the processor; and
    a error checking circuit coupled to the memory and the processor, the error checking circuit comprising:
        a comparator to receive the first data having a predetermined position pattern from the memory, the comparator having a known pattern, the comparator to compare the predetermined position pattern with the known pattern and generate an output;
        a register coupled to receive the first data from the memory and generate a second data; and
        a control circuit coupled to the comparator, the register, and the processor, the control circuit to signal the register to output the second data based on the output of the comparator.

16. The data processing circuit of claim 15, wherein control circuit signals the register to output the second data if the predetermined position pattern matches the known pattern.

17. The data processing circuit of claim 16, wherein the control circuit signals the processor to terminate transmission of the first data if the predetermined position pattern does not match the known pattern.

18. The data processing circuit of claim 16, wherein the predetermined position pattern is located in a first byte of the first data and wherein the register clears the predetermined position pattern from the first byte.

19. The data processing circuit of claim 18, wherein the register shifts the first data to begin at the first byte, the shifted data output from the register as the second data.

* * * * *